(12) United States Patent
Ueta et al.

(10) Patent No.: US 11,579,904 B2
(45) Date of Patent: Feb. 14, 2023

(54) LEARNING DATA COLLECTION DEVICE, LEARNING DATA COLLECTION SYSTEM, AND LEARNING DATA COLLECTION METHOD

(71) Applicant: PANASONIC INTELLECTUAL PROPERTY MANAGEMENT CO., LTD., Osaka (JP)

(72) Inventors: Daisuke Ueta, Kanagawa (JP); Makoto Shinzaki, Kanagawa (JP); Yuichi Matsumoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 116 days.

(21) Appl. No.: 17/256,871

(22) PCT Filed: Apr. 23, 2019

(86) PCT No.: PCT/JP2019/017236
§ 371 (c)(1),
(2) Date: Dec. 29, 2020

(87) PCT Pub. No.: WO2020/008710
PCT Pub. Date: Jan. 9, 2020

(65) Prior Publication Data
US 2021/0264210 A1 Aug. 26, 2021

(30) Foreign Application Priority Data
Jul. 2, 2018 (JP) .............................. JP2018-126399

(51) Int. Cl.
*G06F 9/451* (2018.01)
*G06K 9/62* (2022.01)
(Continued)

(52) U.S. Cl.
CPC ............ *G06F 9/453* (2018.02); *G06K 9/6257* (2013.01); *G06V 10/10* (2022.01); *G06V 20/20* (2022.01)

(58) Field of Classification Search
CPC .. G06K 9/6257; G06K 9/6253; G06K 9/6256; G06F 9/453; G06V 10/10;
(Continued)

(56) References Cited

U.S. PATENT DOCUMENTS

| 10,664,722 B1* | 5/2020 | Sharma ................ G06V 10/776 |
| 2004/0100486 A1* | 5/2004 | Flamini ............. H04N 21/4312 348/E5.103 |

(Continued)

FOREIGN PATENT DOCUMENTS

| JP | 2004-295879 A | 10/2004 |
| JP | 2014-178957 | 9/2014 |

(Continued)

OTHER PUBLICATIONS

Office Action dated May 10, 2022 issued in Japanese patent application No. 2018-126399 (publication No. 2020-008904A), along with corresponding English translation.

(Continued)

*Primary Examiner* — Tadesse Hailu
*Assistant Examiner* — Alvaro R Calderon, IV
(74) *Attorney, Agent, or Firm* — Greenblum & Bernstein, P.L.C.

(57) ABSTRACT

In collection of training data for image recognition, in order to support a reduction in collection of improper images which are not suitable as training data, a learning data collection device includes a processor which is configured to acquire a captured image from an image capturing device, determine whether or not the captured image is suitable as training data, and when the captured image is determined to (Continued)

be not suitable as training data, perform a notification operation to prompt an image capturing person to reshoot a new image for the captured image.

16 Claims, 7 Drawing Sheets

(51) Int. Cl.
*G06V 10/10* (2022.01)
*G06V 20/20* (2022.01)
(58) Field of Classification Search
CPC ............ G06V 20/20; G06V 10/993; G06T 2207/20081; G06T 2207/30168; G06T 7/0002; G06N 20/00
See application file for complete search history.

(56) References Cited

U.S. PATENT DOCUMENTS

| | | | |
|---|---|---|---|
| 2006/0165265 A1* | 7/2006 | Fujimatsu | G06V 40/19 382/117 |
| 2007/0229658 A1* | 10/2007 | Kanamori | G06T 3/40 348/207.99 |
| 2009/0304239 A1* | 12/2009 | Itou | H04N 1/448 382/118 |
| 2013/0008962 A1* | 1/2013 | Anand | G06V 10/225 235/487 |
| 2014/0313415 A1* | 10/2014 | Yokomitsu | G06V 40/165 348/604 |
| 2014/0333775 A1* | 11/2014 | Naikal | H04N 21/44008 348/159 |
| 2015/0071529 A1 | 3/2015 | Yokoi et al. | |
| 2015/0363670 A1* | 12/2015 | Sugishita | G06V 10/96 382/218 |
| 2016/0071265 A1* | 3/2016 | Sandmann | H04N 5/2256 348/61 |
| 2016/0188993 A1* | 6/2016 | Beato | G06V 10/60 382/163 |
| 2017/0293640 A1* | 10/2017 | Kish | G06V 20/70 |
| 2017/0351934 A1 | 12/2017 | Ruan et al. | |
| 2018/0130225 A1 | 5/2018 | Hatanaka et al. | |
| 2018/0157907 A1* | 6/2018 | Loginov | G06V 30/40 |
| 2018/0260665 A1* | 9/2018 | Zhang | G06V 20/66 |
| 2018/0322327 A1* | 11/2018 | Smith | G06V 10/82 |
| 2018/0352150 A1* | 12/2018 | Purwar | H04N 5/445 |
| 2019/0005358 A1* | 1/2019 | Pisoni | G06V 10/82 |
| 2019/0080432 A1* | 3/2019 | Miller | G06V 20/10 |
| 2019/0080448 A1* | 3/2019 | Dewitt | G06V 10/242 |
| 2019/0138791 A1 | 5/2019 | Wang et al. | |
| 2019/0261938 A1* | 8/2019 | Sevenster | G06V 10/98 |
| 2019/0332952 A1* | 10/2019 | Nonaka | G06V 30/194 |
| 2019/0341150 A1* | 11/2019 | Mostofi | G16H 70/60 |
| 2019/0347547 A1* | 11/2019 | Ebstyne | G06V 20/00 |
| 2020/0342259 A1* | 10/2020 | Jordan | G06T 7/70 |
| 2021/0019872 A1* | 1/2021 | Kang | G06T 7/0002 |

FOREIGN PATENT DOCUMENTS

| | | |
|---|---|---|
| JP | 2015-026894 A | 2/2015 |
| JP | 2016-162423 A | 9/2016 |
| JP | 2018-045390 | 3/2018 |
| WO | 2018/028546 A1 | 2/2018 |
| WO | 2018/095792 A1 | 5/2018 |

OTHER PUBLICATIONS

Official Communication issued in International Patent Application No. PCT/JP2019/017236, dated Jun. 11, 2019, along with an English translation thereof.
Extended European Search Report dated Jul. 26, 2021 issued in European patent application No. 19829839.0.
Jingjing Yang et al: "Multiple kernel active learning for image classification", Multimedia and Expo, 2009. ICME 2009, IEEE International Conference On, IEEE, Piscataway, NJ, USA, Jun. 28, 2009, (Jun. 28, 2009), pp. 550-553, XP031510811, ISBN: 978-1-4244-4290-4.

* cited by examiner

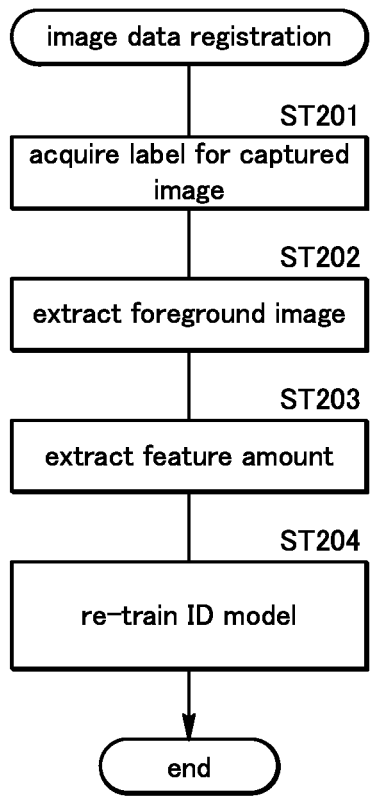

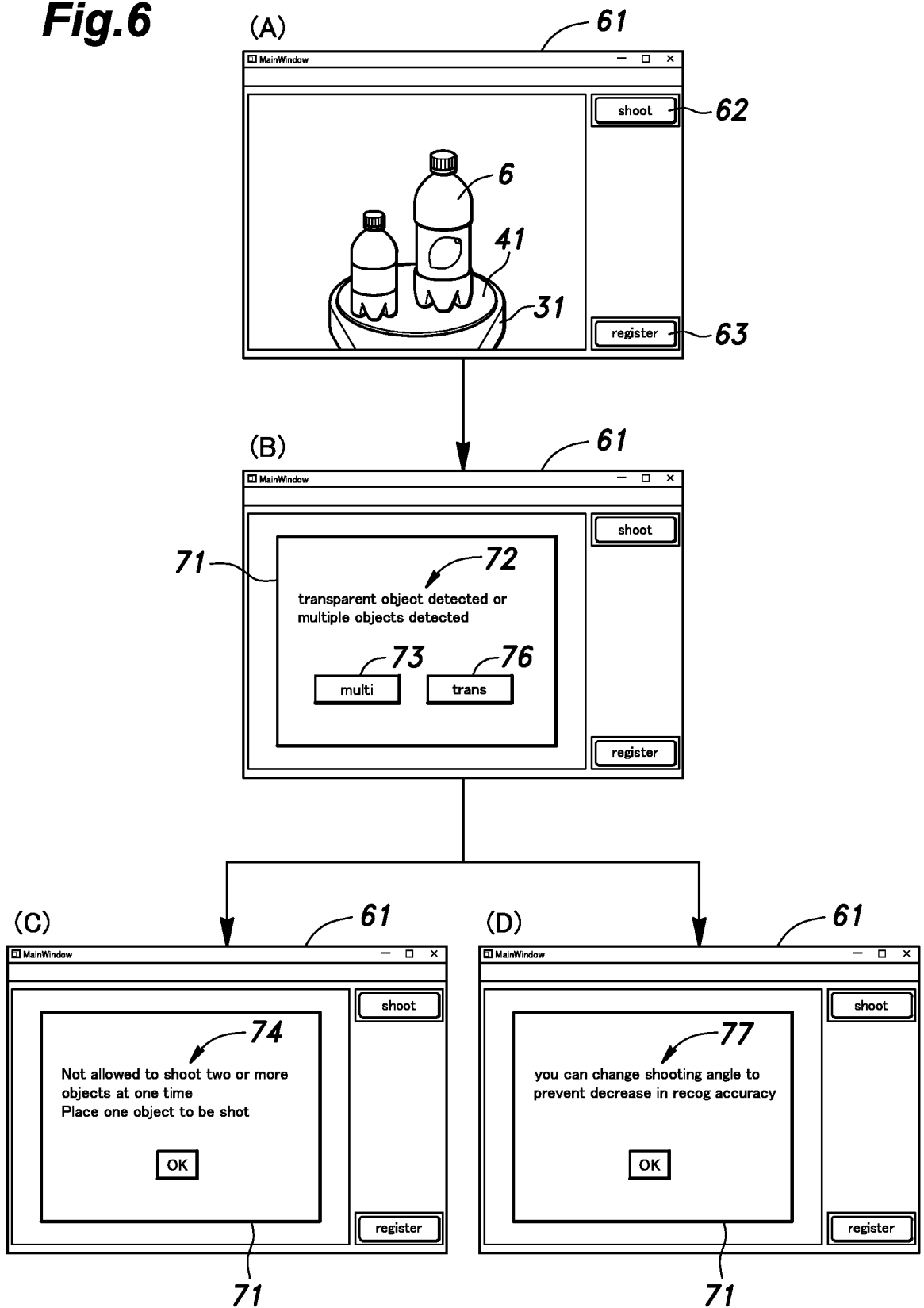

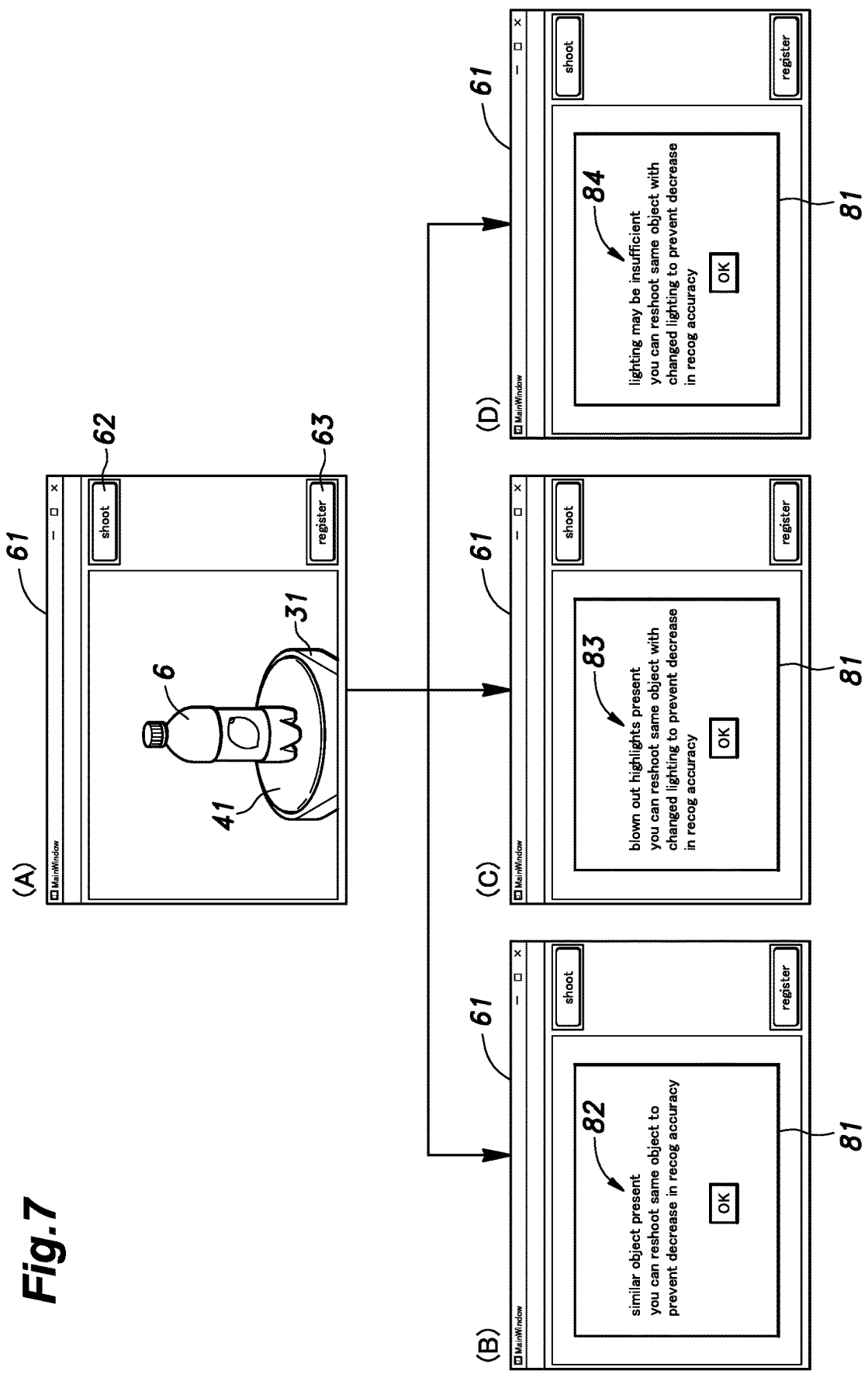

LEARNING DATA COLLECTION DEVICE, LEARNING DATA COLLECTION SYSTEM, AND LEARNING DATA COLLECTION METHOD

TECHNICAL FIELD

The present invention relates to a learning data collection device, a learning data collection system, and a learning data collection method for correcting learning data (i.e., training data) used for image recognition.

BACKGROUND ART

In recent years, image recognition technology, by which an object is recognized from a captured image shot by a camera, has been rapidly advanced with the use of machine learning technology such as deep learning. In image recognition by using machine learning technology, a number of data of captured images of a recognition target object as a subject are collected as learning data (i.e., training data), and a learner is trained with the collected training data to create a trained model, thereby enabling improvement in the accuracy of recognition of the recognition target in an unknown captured image through the use of the trained model.

In collection of such training data, collection of various images of recognition targets as training data is a time-consuming task, which involves shooting images with proper settings of two or more shooting conditions (such as camera settings, lighting settings, the way a recognition target object is placed).

Examples of known technologies for simplifying generation of training data include a training data generator which includes: image capturing means configured to associate each image of an object which is shot under a set of shooting conditions including at least location information about relative location of a camera with respect to the object, with a corresponding piece of shooting environment information which includes information records of the set of shooting conditions, while capturing images with changing the set of shooting conditions; and object area extraction means for extracting an object area corresponding to the object in each captured image, wherein the object area extraction means is configured to extract the object area from a first object image from which the object area is to be extracted, by using a second object image shot under a different set of shooting conditions from that of the first object image (Patent Document 1).

PRIOR ART DOCUMENT (S)

Patent Document(s)

Patent Document 1: JP2014-178957A

SUMMARY OF THE INVENTION

Task to be Accomplished by the Invention

However, since shooting images of a recognition target for collecting a number of training data is not always performed in a proper manner, captured images can include those which are not suitable as training data (for example, images without the recognition target can be included). Training data containing a large amount of such improper images can result in a reduction in the accuracy of image recognition performed by using a model trained by such training data.

However, although the prior art described in Patent Document 1 can provide captured images in which an object is shot with different shooting angles or with different ways the object is placed, the prior art has not taken into account the problem that giving labels to data records can be a heavy workload for an operator.

The present invention has been made in view of the problem of the prior art, and a primary object of the present invention is to provide a learning data collection device, a learning data collection system, and a learning data collection method which can, when collecting training data for image recognition, reduce collection of improper images which are not suitable as training data.

Means to Accomplish the Task

An aspect of the present disclosure provides a learning data collection device for collecting captured images generated by an image capturing device as training data for image recognition, the image capturing device being used by an image capturing person to shoot an image of a recognition target, the learning data collection device comprising: a processor configured to perform operations for collection of the training data, wherein the processor is configured to: acquire a captured image from the image capturing device; determine whether or not the captured image is suitable as training data; and when the captured image is determined to be not suitable as training data, perform a notification operation to prompt the image capturing person to reshoot a new image for the captured image.

Another aspect of the present disclosure provides a learning data collection system comprising the learning data collection device, and the image capturing device.

Yet another aspect of the present disclosure provides a learning data collection method for collecting captured images generated by an image capturing device as training data for image recognition, the image capturing device being used by an image capturing person to shoot an image of a recognition target, the method comprising: acquiring a captured image from the image capturing device; determining whether or not the captured image is suitable as training data; and when the captured image is determined to be not suitable as training data, perform a notification operation to prompt the image capturing person to reshoot a new image for the captured image.

Effect of the Invention

According to a learning data collection device, a learning data collection system, and a learning data collection method, in collecting training data for image recognition, it is possible to reduce collection of improper images which are not suitable as training data.

BRIEF DESCRIPTION OF THE DRAWINGS

FIG. 5 is a flow chart showing a detail of a captured image data registration operation in step ST102 in FIG. 4;

FIG. 6 is an explanatory diagram showing a first example of screens displayed on a display device for an image capturing person, in the training data collection operation shown in FIG. 4; and FIG. 7 is an explanatory diagram showing a second example of screens displayed on a display device for an image capturing person, in the training data collection operation in FIG. 4;

DESCRIPTION OF THE PREFERRED EMBODIMENT(S)

Figure 1:
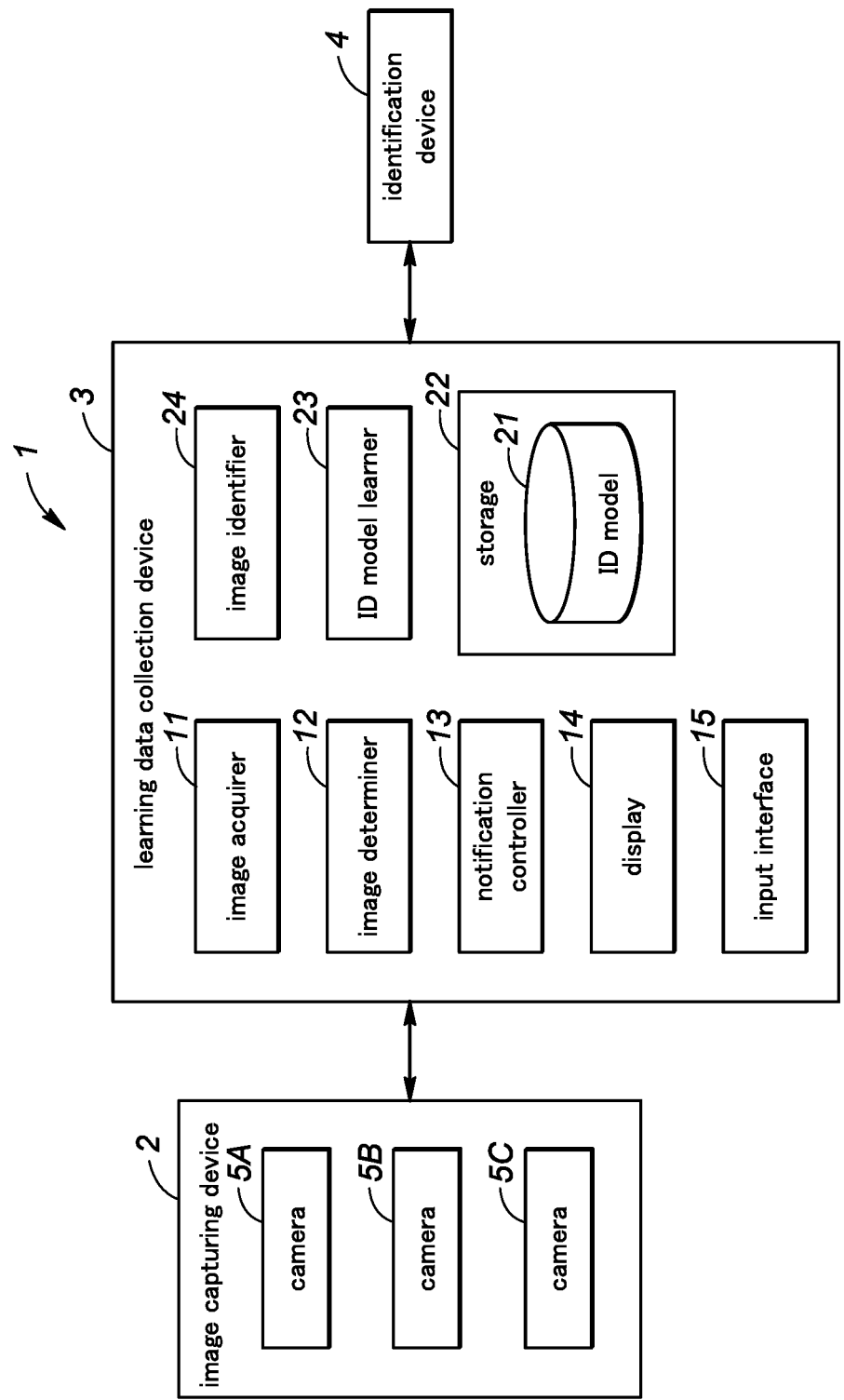
FIG. 1 is a diagram showing a general configuration of a learning data collection system according to the present disclosure.

A first aspect of the present invention made to achieve the above-described object is a learning data collection device for collecting captured images generated by an image capturing device as training data for image recognition, the image capturing device being used by an image capturing person to shoot an image of a recognition target, the learning data collection device comprising: a processor configured to perform operations for collection of the training data, wherein the processor is configured to: acquire a captured image from the image capturing device; determine whether or not the captured image is suitable as training data; and when the captured image is determined to be not suitable as training data, perform a notification operation to prompt the image capturing person to reshoot a new image for the captured image.

In this configuration, in collecting training data for image recognition, when the captured image is determined to be not suitable as training data, it is possible to prompt the image capturing person to reshoot a new image, thereby reducing collection of improper images which are not suitable as training data.

A second aspect of the present invention is the learning data collection device of the first aspect, further comprising a display device configured to display information based on the control of the processor, wherein, as the notification operation, the processor causes the display device to display a notification screen for prompting the image capturing person to reshoot the new image.

In this configuration, when the captured image is determined to be not suitable as training data, it is possible to easily and clearly prompt the image capturing person to reshoot a new image.

A third aspect of the present invention is the learning data collection device of the first or second aspect, wherein the processor is configured to: perform a determination operation by using different determination criteria to determine whether or not each captured image is suitable as training data; and perform a selected one of the different modes of the notification operation depending on types of the determination criteria used for the determination operation.

This configuration can prompt the image capturing person to reshoot a new image depending on types of the determination, thereby enabling the notification operation to be performed in a proper manner.

A fourth aspect of the present invention is the learning data collection device of the third aspect, further comprising a storage device for storing data based on the control of the processor; and wherein the different modes of the notification operation include: a reshoot-instruction operation which is performed such that training data associated with the captured image is banned from being stored in the storage device; and a reshoot-recommendation operation which is performed such that training data associated with the captured image is permitted to be stored in the storage device.

This configuration can, even when the captured image is determined to be not suitable as training data, determines whether or not the captured image is permitted to be stored as training data depending on the degree of suitability (i.e., depending on how unsuitable the captured image is), thereby preventing an excessive interference with the image capturing person's shooting operation (and thus collecting training data).

A fifth aspect of the present invention is the learning data collection device of the fourth aspect, wherein the processor is configured to: when determining that the captured image includes a plurality of recognition targets, accept an input indicating that the recognition targets include either a plurality of objects or an object having a transparent part; when receiving an input indicating that the recognition targets include a plurality of objects, perform the reshoot-instruction operation; and when receiving an input indicating that the recognition targets include an object having a transparent part, perform the reshoot-recommendation operation.

This configuration can, even when determining that the captured image includes a plurality of objects, determine whether or not the captured image of the objects is permitted to be stored depending on whether or not the objects includes a transparent portion, thereby preventing an excessive interference with the image capturing person's shooting operation (and thus collecting training data).

A sixth aspect of the present invention is the learning data collection device of the fourth aspect, wherein the processor is configured to: before determining whether or not each captured image is suitable as training data, store the captured image acquired from the image capturing device in the storage device as training data; and when performing the reshoot-instruction operation for a captured image which is determined to be not suitable as training data, cancel registration of the captured image registered as training data.

This configuration can eliminate improper images which are not suitable as training data without excessively interfering with the training data collection operation.

A seventh aspect of the present invention is the learning data collection device of any of the first to sixth aspects, wherein the processor is configured to: acquire a set of captured images of the recognition target, the captured images having been simultaneously captured from opposite directions; and when the set of captured images includes at least one captured image which is determined to be not suitable as training data, perform a notification operation to prompt the image capturing person to reshoot a new set of images for the set of captured images.

This configuration can acquire a set of captured images of the recognition target, the captured images being simultaneously captured from opposite directions by the plurality of cameras, while reducing collection of improper images which are not suitable as training data.

An eighth aspect of the present invention is the learning data collection device of any of the first to seventh aspects, wherein the processor is configured to: acquire a result of an operation for image recognition of the recognition target in the captured image registered as training data, wherein a prebuilt trained identification model is used in the operation for image recognition; and when, from the result of the operation for image recognition, the recognition target is determined to be similar to a different object registered as training data, determine that the captured image is not suitable as training data.

In this configuration, when the recognition target in the captured image is similar to a different object registered as training data (i.e. when the recognition target in the captured image can be confused with the different object), it is possible to prompt an image capturing person to reshoot a new image, thereby reducing collection of images which are not suitable as training data.

A ninth aspect of the present invention is a learning data collection system comprising the learning data collection device, and the image capturing device.

In this configuration, in collecting training data for image recognition, when the captured image is determined to be not suitable as training data, it is possible to prompt the image capturing person to reshoot a new image, thereby reducing collection of improper images which are not suitable as training data.

A tenth aspect of the present invention is a learning data collection method for collecting captured images generated by an image capturing device as training data for image recognition, the image capturing device being used by an image capturing person to shoot an image of a recognition target, the method comprising: acquiring a captured image from the image capturing device; determining whether or not the captured image is suitable as training data; and when the captured image is determined to be not suitable as training data, perform a notification operation to prompt the image capturing person to reshoot a new image for the captured image.

An eleventh aspect of the present invention is the learning data collection method of the tenth aspect, wherein the step of performing the notification operation comprises causing a display device to display a notification screen for prompting the image capturing person to reshoot the new image.

A twelfth aspect of the present invention is the learning data collection method of the tenth or eleventh aspect, further comprising: performing a determination operation by using different determination criteria to determine whether or not each captured image is suitable as training data; and performing a selected one of the different modes of the notification operation depending on types of the determination criteria used for the determination operation.

A thirteenth aspect of the present invention is the learning data collection method of the twelfth aspect, wherein the different modes of the notification operation include: a reshoot-instruction operation which is performed such that training data associated with the captured image is banned from being stored in a storage device; and a reshoot-recommendation operation which is performed such that training data associated with the captured image is permitted to be stored in the storage device.

A fourteenth aspect of the present invention is the learning data collection method of the thirteenth aspect, further comprising: when determining that the captured image includes a plurality of recognition targets, accepting an input indicating that the recognition targets include either a plurality of objects or an object having a transparent part; when receiving an input indicating that the recognition targets include a plurality of objects, performing the reshoot-instruction operation; and when receiving an input indicating that the recognition targets include an object having a transparent part, performing the reshoot-recommendation operation.

A fifteenth aspect of the present invention is the learning data collection method of the fourteenth aspect, further comprising: before determining whether or not each captured image is suitable as training data, storing the captured image acquired from the image capturing device in the storage device as training data; and when performing the reshoot-instruction operation for a captured image which is determined to be not suitable as training data, canceling registration of the captured image registered as training data.

A sixteenth aspect of the present invention is the learning data collection method of any of the tenth to fifteenth aspects, further comprising: acquiring a result of an operation for image recognition of the recognition target in the captured image registered as training data, wherein a pre-built trained identification model is used in the operation for image recognition; and when, from the result of the operation for image recognition, the recognition target is determined to be identical with or similar to an object registered as training data, determining that the captured image is not suitable as training data.

A seventeenth aspect of the present invention is the learning data collection method of any of the tenth to sixteenth aspects, further comprising: performing an operation for image recognition of the recognition target in the captured image registered as training data, wherein a pre-built trained identification model is used in the operation for image recognition; and when, from a result of the operation for image recognition, the recognition target is determined to be similar to an object registered as training data, determining that the captured image is not suitable as training data.

Embodiments of the present invention will be described below with reference to the drawings.

First Embodiment

FIG. 1 is a diagram showing a general configuration of a learning data collection system according to the present disclosure.

The learning data collection system 1 mainly includes: an image capturing device 2 which can be used by an image capturing person to shoot an image of a recognition target 6 (see FIG. 2); a learning data collection device 3 configured to perform an operation for collection of images generated by the image capturing device 2 as training data (hereinafter, referred to as "training data collection operation"); and an identification device 4 configured to shoot an unknown object(s) for identification.

The image capturing device 2 includes a plurality of cameras 5A-5C capable of simultaneously capturing images of the recognition target 6 from different directions i.e., in different shooting angles. The cameras are so arranged because such an arrangement enables the system to acquire a feature(s) or characteristics of the total appearance of each recognition target so that the identification device 4 can correctly identify the recognition target even when the way the recognition target is placed is changed. The cameras 5A-5C may be video cameras having a known shooting function, and capable of generating images (moving images or still images) of the recognition target 6 as a subject. Furthermore, the image capturing device 2 has a known communication function and capable of sequentially transmitting captured images to the learning data collection device 3. The image capturing device 2 can be connected to the learning data collection device 3 through a known communication cable or wireless communications. In other cases, the image capturing device 2 may be connected to the learning data collection device 3 via a known communication network (LAN or any other type of network).

The recognition target 6 shot by the image capturing device 2 is not limited to those shown in the drawings and described herein, and may be any object that can be a target of image recognition. The captured images generated by the cameras 5A-5C may have any form as long as they can be used for image recognition (i.e., identification of a recognition target 6). For example, the cameras 5A-5C may be equipped with RGB-D sensors so that RGB images and distance images are generated as captured images.

The learning data collection device 3 includes: an image acquirer 11 configured to sequentially acquires captured images generated by the image capturing device 2; an image determiner 12 configured to sequentially determine whether or not each of the captured images is suitable as training data; a notification controller 13 configured such that, when a captured image is determined to be not suitable as training data, the notification controller 13 performs a notification operation to prompt an image capturing person to reshoot a new image for the captured image; a display 14 configured to display information necessary for the image capturing person; and an input interface 15 which is used by a user (for example, image capturing person) to perform an input operation to provide an input to the learning data collection device 3. As will be described in detail later, the display 14 can display, for example, information related to the notification operation performed by the notification controller 13, for prompting an image capturing person to reshoot.

Moreover, the learning data collection device 3 includes: a storage 22 configured to store an identification model (hereinafter, also referred to as "ID model") 21 used for image recognition (identification of an unknown object) by using machine learning technology; an ID model learner 23 configured to perform re-training the ID model 21 with captured images which is determined by the image determiner 12 to be suitable as training data; and an image identifier 24 configure to identify, by using the ID model 21, the recognition target 6 included in captured images or an unknown object captured by the identification device 4. The ID model 21 is a prebuilt trained model, and use of the ID model trained with captured images collected by the learning data collection device 3 as training data can improve the accuracy rate or accuracy in identification (image recognition) of an unknown object.

The identification device 4 includes an identification camera (not shown) for shooting an unknown object. The identification device 4 transmits captured images including the unknown object (i.e., a subject) shot by the identification camera, to the learning data collection device 3. As a result, the image identifier 24 of the learning data collection device 3 can perform an operation to, by using the ID model 21, identify the unknown object included in the captured images provided from the identification device 4 (hereinafter, referred to as "object recognition operation"). The identification camera may be the same type of camera as the above-described cameras 5A-5C.

The function of performing the object recognition operation in the learning data collection system 1 is not essential to the system 1, and the re-trained ID model 21 may be used in another system. In this case, the identification device 4 can be omitted from the learning data collection system 1.

Figure 2:
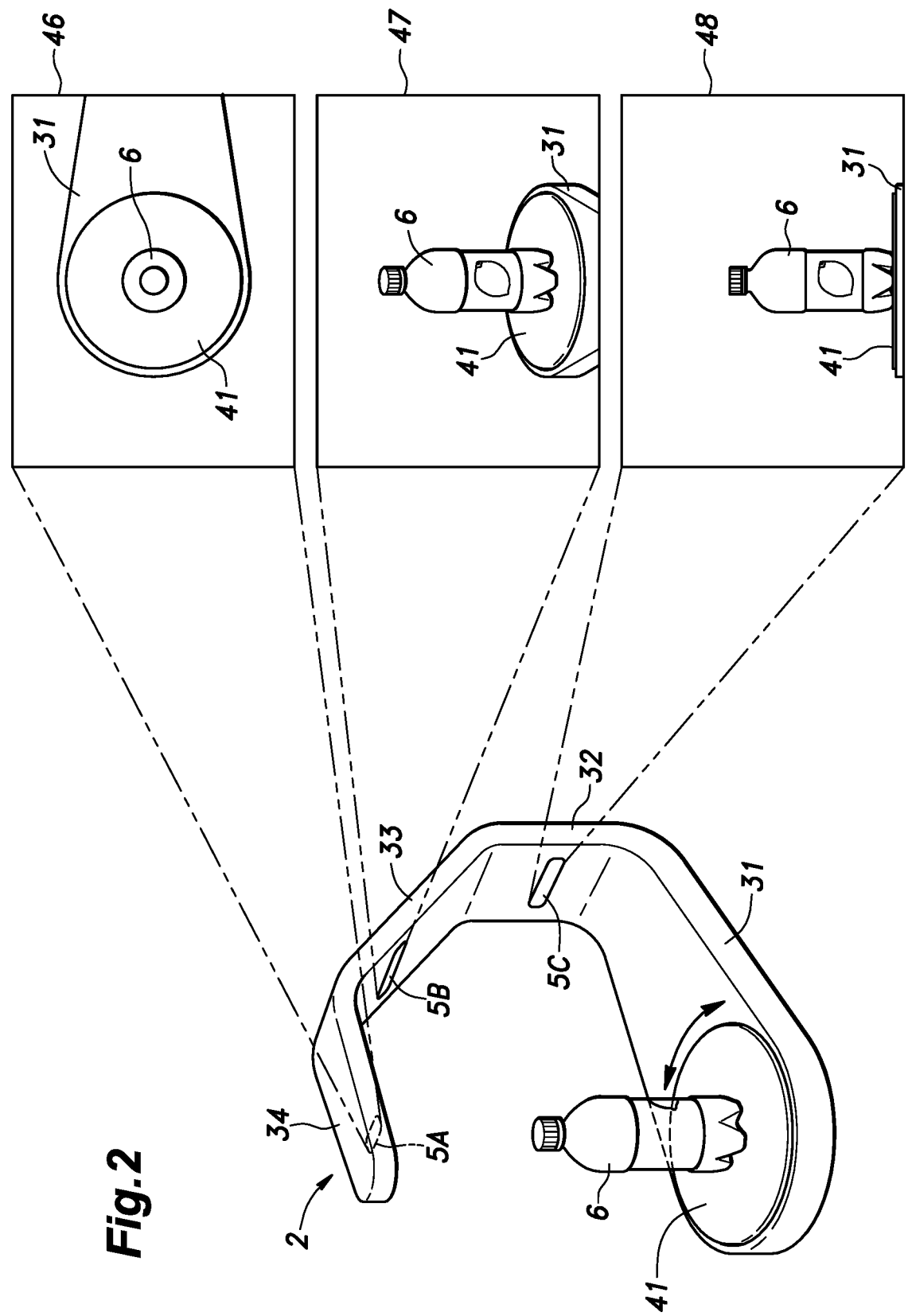
FIG. 2 is an explanatory diagram showing an example of a configuration of an image capturing device.

FIG. 2 is an explanatory diagram showing an example of a configuration of the image capturing device 2.

The image capturing device 2 includes: a substantially flat plate-shaped base portion 31 to be placed on the floor surface, desk surface, or any other surface; a substantially flat plate-shaped first arm portion 32 extending in the substantially vertical direction from one end of the base portion 31; a substantially flat plate-shaped second arm portion 33 extending diagonally upward from the upper end of the first arm portion 32 toward the other end of the base portion 31; and a third arm portion 34 extending in the substantially horizontal direction from the upper end of the second arm portion 33 toward the horizontal position of the other end of the base portion 31. Although not shown in FIG. 2, the image capturing device 2 further includes a built-in battery (or a power cable), a wireless communication device (or a communication cable) for communicating with the learning data collection device 3, and other components or functional units.

The base portion 31 is provided with a turntable 41 which is rotatable on an axis in the vertical direction. An image capturing person can place the recognition target (in this embodiment, a beverage container) 6 on the turntable 41 and rotate the turntable 41 at a desired rotation angle to thereby change the shooting angles with which the recognition target 6 is shot by the cameras 5A-5C (i.e., change relative positions of the recognition target 6 with regard to the cameras 5A-5C).

The downward camera 5A is provided on the lower surface of the third arm portion 34. The viewing direction of the downward camera 5A is toward the turntable 41 on the lower side, and the downward camera 5A can shoot an image 46 which generally corresponds to a plan view of the recognition target 6.

The diagonally-directed camera 5B is provided on the lower surface (the inner side) of the second arm portion 33. The viewing direction of the diagonally-directed camera 5B is diagonally downward to the turntable 41, and the diagonally-directed camera 5B can shoot an image 47 which generally corresponds to a perspective view of the recognition target 6 viewed from above.

A side-view camera 5C is provided on the inner surface of the first arm portion 32 (on the side of the other end of the base portion 31). The viewing direction of the side-view camera 5C (located above the turntable 41) is a substantially horizontal direction, and the side-view camera 5C can shoot an image 48 which generally corresponds to a side e view of the recognition target 6.

The configurational characteristics of the image capturing device 2 (such as the number of cameras and the cameras' viewing directions) are not limited to those of the image capturing device 2 shown in FIG. 2, and various changes can be made thereto. Any configuration of the image capturing device 2 is possible as long as the image capturing device 2 includes at least one camera.

Figure 3:
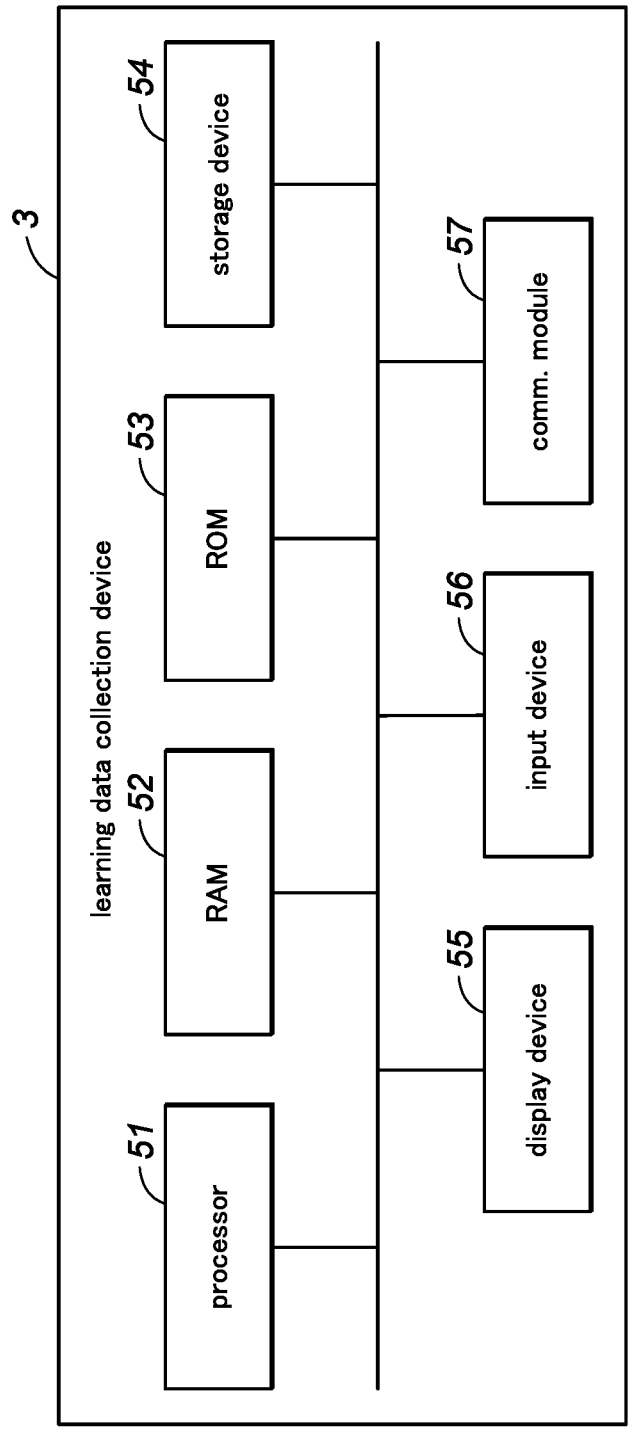
FIG. 3 is an explanatory diagram showing a hardware configuration of a learning data collection device.

FIG. 3 is an explanatory diagram showing a hardware configuration of the learning data collection device 3 shown in FIG. 1.

The learning data collection device 3 is implemented by a computer having a known hardware configuration, and includes: a processor 51 configured to execute the whole training data collection operation (which can include the object recognition operation as necessary) based on prescribed control programs; a RAM 52 which is a volatile memory for functioning as a processing work area of memory for the processor 51; a ROM 53 which is a non-volatile memory for storing data and control programs executable by the processor 51; a storage device 54 such as an HDD, a flash memory, or any other storage device; a display device 55 such as a liquid crystal monitor; an input device 56 including interface devices such as a keyboard, a mouse, and a touch panel; and a communication module 57 used for communications with other devices.

The display 14, the input interface 15, and the storage 22 in the learning data collection device 3 shown in FIG. 1 can be functionally implemented by the display device 55, the input device 56, and the storage device 54, respectively. The image acquirer 11, the image determiner 12, the notification controller 13, the ID model learner 23, and the image identifier 24 in the learning data collection device 3 can be at least partially functionally implemented by the processor 51 executing the control programs. The configurational characteristics of the learning data collection device 3 are not limited to those shown in FIG. 3, and at least part of the functions of the learning data collection device 3 may be implemented by an operation(s) performed by other known hardware, instead of being implemented by the learning data collection device 3.

Figure 4:
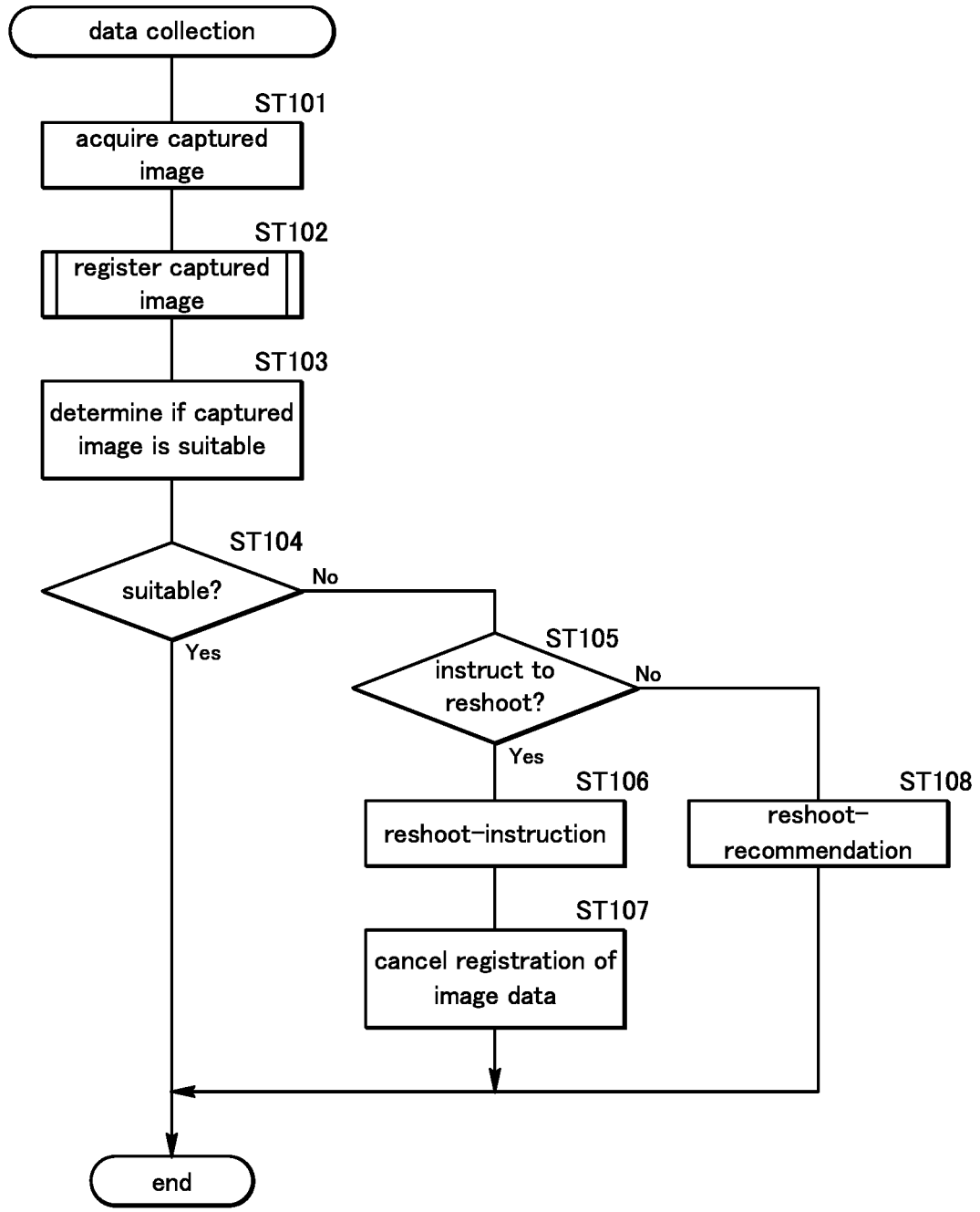
FIG. 4 is a flow chart showing a flow of a training data collection operation performed by the learning data collection device.

FIG. 4 is a flow chart showing a flow of a training data collection operation performed by the learning data collection device 3, and FIG. 5 is a flow chart showing a detail of a captured image data registration operation in step ST102 in FIG. 4.

In the learning data collection system 1, when an image capturing person shoots a recognition target by using the image capturing device 2, shooting data including a captured image and related information (shooting conditions of the cameras 5A-5C, and other information) is transmitted from the image capturing device 2 to the learning data collection device 3. Then, the learning data collection device 3 receives (acquires) the shooting data (ST101). The image capturing person can place the recognition target 6 on the turntable 41 in a desired manner. After adjusting the rotational angle of the turntable 41, the image capturing person can click (press) a shooting button 62 included in a shooting screen 61 (see FIG. 6A) displayed on the display device 55, thereby causing the cameras 5A-5C to shoot images.

In step ST101, the learning data collection device 3 acquires shooting data including a set of captured images (three captured images) simultaneously shot by the cameras 5A-5C. However, the operation of the learning data collection device 3 is not limited to this, and any operation method is possible as long as the learning data collection system 1 can acquire at least one captured image.

Next, the learning data collection device 3 performs an operation of registering the acquired shooting data as training data (hereinafter, referred to as "shooting data registration operation") (ST102). In the present embodiment, the image capturing person can cause the learning data collection device 3 to perform the shooting data registration operation by clicking (pressing) a registration button 63 on the shooting screen 61 (see FIG. 6A).

In the shooting data registration operation in step ST102, as shown in FIG. 5, the learning data collection device 3 first acquires label information entered by the image capturing person for the captured image acquired from the image capturing device 2 (that is, the captured image of the recognition target) (ST201).

Subsequently, the learning data collection device 3 extracts a foreground image in the captured image as an image region for the recognition target by a known method (ST202). The foreground image can be extracted, for example, based on difference from a background image.

Then, the learning data collection device 3 extracts a feature amount from the extracted foreground image by a known method (ST203). For example, the learning data collection device 3 can extract a feature amount by using a known extraction method such as HOG (Histograms of Oriented Gradients) or SURF (Speeded-Up Robust Features), or a method using deep learning technology.

Then, the learning data collection device 3 performs an operation for re-training the ID model 21 with data of the feature amount extracted in step ST203 (ST204). The function of re-training (implemented as the ID model learner 23) in the learning data collection system 1 is not essential to the system 1, and the collected training data may be utilized in other systems.

Referring again to FIG. 4, the learning data collection device 3 subsequently determines whether or not the captured image is suitable as training data (ST103).

In step ST103, the learning data collection device 3 can use a plurality of determination criteria (1)-(7) as described below in determining the suitability of a captured image as training data.

(1) Determination on Whether or not a Similar Object is Registered

The learning data collection device 3 can determine, by using the ID model 21, whether or not a captured image is suitable as training data based on whether or not a different object (feature amount) similar to the recognition target is registered. More specifically, in the learning data collection device 3, the image identifier 24 detects an object having similar characteristics to the captured image (for example, an object having a recognition confidence score which exceeds a prescribed threshold value). When the detected object is different from the label entered by the image capturing person in step ST201 described above; that is, being in a state where a different object registered in the ID model 21 can be confused with the recognition target in the captured image, the image determiner 12 determines that the captured image (i.e. one in which the recognition target therein can be confused with a different object) is not suitable as training data.

In response to this determination result, the learning data collection device 3 recommends the image capturing person to reshoot the recognition target in order to acquire a new captured image with different shooting conditions for the recognition target, and this operation of the learning data collection device 3 is one mode of the above-described notification operation. As will be described in detail later, the reshoot-recommendation operation is performed so that training data of the captured image is permitted to be stored in the storage device 54 (i.e. re-training the ID model 21 is permitted). This enables the system to acquire a captured image (training data) which makes it easier to extract a feature of the recognition target. As a result, an improvement can be made in the accuracy rate or accuracy in the identification between the recognition target and a different similar object by using the ID model 21.

(2) Determination on Whether or not a Hand is Included in the Captured Image

The learning data collection device 3 can determine whether or not the captured image is suitable as training data based on whether or not a human hand (e.g., a hand of the image capturing person) is present in the captured image. More specifically, when the learning data collection device 3 determines, by using a known method, that a human hand is present in the captured image (for example, feature points of a human hand are extracted from the captured image), the image determiner 12 determines that the captured image is not suitable because a feature amount may include the feature of a hand.

In response to this determination result, the learning data collection device 3 recommends the image capturing person to reshoot the recognition target in order to acquire a new captured image without human hands. This enables the system to acquire a proper captured image.

(3) Determination on Whether or not a Transparent Object is Included in the Captured Image The learning data collection device 3 can determine whether the captured image is suitable as training data based on whether or not an at least partially transparent object (the recognition target) is present in the captured image. More specifically, when the learning data collection device 3 determines, by using a known method, that an object that is at least partially transparent is present in the captured image (for example, an object from which the entire contour of the recognition target cannot be extract), the image determiner 12 determines that the captured image is not suitable because the transparent (or translucent) part may not be recognized as part of the recognition target (that is, the part may be recognized as the background).

In response to this determination result, the learning data collection device 3 recommends the image capturing person to reshoot the recognition target in order to acquire a proper captured image even in the case of the partially transparent recognition target. This enables the image capturing person to shoot a proper captured image, for example, by changing the way the recognition target is placed.

(4) Determination on Whether or not a Plurality of Objects are Included in the Captured Image The learning data collection device 3 can determine whether or not a captured image is suitable as training data based on whether or not a plurality of objects (recognition targets) are present in the captured image. More specifically, when the learning data collection device 3 determines, by using a known method, that a plurality of objects are present in the captured image (e.g., when multiple separate foreground regions are extracted), the image determiner 12 determines that the captured image is not suitable because a feature amount extracted as training data may include a feature of a different object. Alternatively, when a partially transparent object (an object having multiple opaque parts separated from each other) is present in the captured image as described above, the learning data collection device 3 may determine that a plurality of objects (recognition targets) are present in the captured image.

In response to this determination result, the learning data collection device 3 instructs the image capturing person to reshoot the recognition target (i.e., performs a reshoot-instruction operation) in order to acquire a captured image in which multiple recognition targets are not present, and this operation of learning data collection device 3 is one mode of the above-described notification operation. As will be described in detail later, the reshoot-instruction operation is performed so that training data of the captured image is banned from being stored in the storage device 54 (i.e. re-training the ID model 21 is banned). This enables the image capturing person to take a proper captured image, for example, by changing a subject to a single recognition target (removing the other objects from a region to be shot), or changing the way a partially transparent object (i.e., an object having multiple opaque parts separated from each other) is placed.

(5) Determination on Whether or not Improper Lighting Conditions (Reflections) are Present The learning data collection device 3 can determine whether or not a captured image is suitable as training data based on whether or not the captured image includes a blown out highlighted area (an area that is almost entirely filled with white) is present. More specifically, when the learning data collection device 3 determines, by using a known method, that a proportion (or an area) of the blown out highlights in the captured image is equal to or greater than a prescribed threshold value, the image determiner 12 determines that the captured image is not suitable because it is difficult to extract a feature from the texture of the recognition target in the captured image.

In response to this determination result, the learning data collection device 3 instructs the image capturing person to reshoot the recognition target in order to acquire a proper captured image which includes little or no blown out highlights. This enables the image capturing person to shoot a proper image, for example, by changing the direction of lighting (or changing the relative position or angle of the recognition target with regard to illuminating light). When a proportion (or an area) of the blown out highlights present in the captured image is less than the prescribed threshold value, the learning data collection device 3 recommends the image capturing person to reshoot the recognition target because, in this case, a new image is not essential.

(6) Determination on Whether or not the Recognition Target has a Small Size (a Small Object)

The learning data collection device 3 can determine whether or not the captured image is suitable as training data based on whether or not the recognition target in the captured image is a small object. More specifically, when the learning data collection device 3 determines, by using a known method, that a proportion (or an area) of the image region of the recognition target with an entire area which is less than a prescribed threshold value, the image determiner 12 determines that the captured image is not suitable because it is difficult to extract a feature from the image region of the recognition target in the captured image.

In response to this determination result, the learning data collection device 3 recommends the image capturing person to reshoot the recognition target in order to acquire a proper captured image even in the case of the small sized recognition target. This enables the image capturing person to shoot a proper captured image, for example, by expanding the image region of the recognition target by using the zoom function of the cameras 5A-5C or changing the distances between the recognition target and the respective cameras 5A-5C.

(7) Determination on Whether or not a Low Light Condition is Present

The learning data collection device 3 can determine whether or not a captured image is suitable as training data based on whether or not the captured image is shot under a low light condition; that is, the captured image includes a blocked up shadow area (an area that is almost entirely filled with black). More specifically, when the learning data collection device 3 determines, by using a known method, that brightness of the entire captured image (or the recognition target image area) is less than a prescribed threshold value or that a proportion (or an area) of the blocked up shadow area present in the captured image is equal to or greater than a prescribed threshold value, the image determiner 12 determines that the captured image is not suitable because it is difficult to extract a feature from the texture of the recognition target in the captured image.

In response to this determination result, the learning data collection device 3 recommends the image capturing person to reshoot the recognition target in order to acquire a proper captured image by avoiding shooting under a low light condition or by reducing blocked up shadows. This enables the image capturing person to shoot a proper captured image, for example, by adjusting the lighting condition (e.g., by bringing a light source closer to the recognition target or by using an additional lighting device).

In the present embodiment, the learning data collection device 3 performs the step ST103 using all the criteria (1)-(7). However, the operation of determining on whether or not a captured image is suitable as training data is not limited to this method. In some cases, the learning data collection device 3 may perform the determination operation by using at least one of the criteria (1)-(7) selected based on the type of the recognition target or any other condition.

When the learning data collection device 3 performs the operation of the step ST103 using a plurality of determination criteria, the mode of the notification operation is chosen such that the reshoot-instruction operation is given priority over the reshoot-recommendation operation. For example, when the captured image is determined to be improper in (1) the determination operation on whether or not a similar object is registered and in (4) the determination operation on whether or not a plurality of objects are included in the captured image, the result of the determination operation (4), which causes the learning data collection device 3 to perform the reshoot-instruction operation, is given priority over the that of the determination operation (1).

Moreover, when the learning data collection device 3 performs the operation of the step ST103 using a plurality of determination criteria, thereby providing no result which causes the learning data collection device 3 to perform the reshoot-instruction operation, but providing two or more results of the determination operations which causes the learning data collection device 3 to perform the reshoot-recommendation operation, the result of the determination operation with the highest priority is used according to a preset priority levels of the respective determination operations. For example, preset order of priorities may be (1) the determination operation on whether or not a similar object is registered, (2) the determination operation on whether or not a hand is included in the captured image, and (3) the determination operation on whether or not a transparent object is included in the captured image.

In this way, the learning data collection device 3 can properly perform the notification operation to prompt the image capturing person to reshoot the recognition target according to the types of the determination criteria. Furthermore, even when the learning data collection device 3 determines that the captured image is not suitable as training data, the learning data collection device 3 performs one of the different modes of the notification operation (the reshoot-instruction operation and the reshoot-recommendation operation). Thus, the learning data collection device 3 can determine whether or not the training data is permitted to be stored based on the degree of suitability (that is, how unsuitable the captured image is). This enables avoidance of excessive interference with the image capturing person's shooting operation (and thus collection of training data).

Subsequently, when the determination operation in step ST103 determines that the captured image is not suitable as training data (ST104: No), and also determines that the reshoot-instruction operation should be performed for the captured image (ST105: Yes), the learning data collection device 3 performs the reshoot-instruction operation as the notification operation to the image capturing person (ST106).

Next, the learning data collection device 3 cancels the registration of image data which has been registered as training data by the shooting data registration operation in step ST102 (ST107). The enables the learning data collection device 3 to cancel the registration of improper captured images registered as training data (i.e. remove a corresponding data from the ID model 21) without excessively interfering with the training data collection operation.

When the determination operation in step ST103 determines that the captured image is not suitable as training data (ST104: No), and that the reshoot-instruction operation should not be performed for the captured image (ST105: No), the learning data collection device 3 performs the reshoot-recommendation operation as the notification operation to the image capturing person (ST108).

In the training data collection operation is performed, every time the image capturing person shoots a recognition target, the learning data collection device 3 repeats the series of operations described above. In addition, as will be described later with reference to FIGS. 6 and 7, when the training data collection operation is performed, the display device 55 displays screens for an image capturing person with respect to some steps including the steps ST105, ST106, and ST108.

The shooting data registration operation in step ST120 is not necessarily performed before step ST103. For example, the shooting data registration operation may be performed after the captured image is determined to be suitable as training data in step ST104 (Yes in ST104), or after ST108. In these cases, since training data has not yet been registered in ST106, the learning data collection device 3 skips an operation of canceling the registration of the improper captured image registered as training data in ST106. In addition, embodiments of the present invention are not limited to those in which the display device displays information in step ST108 in the same manner as in step ST106 described above.

As described above, the learning data collection system 1 performs the collection of training data used for image recognition such that, when a captured image is determined to be unsuitable as training data, the system prompts an image capturing person to reshoot a new image, thereby enabling reduction of collection of improper captured images which are not suitable as training data.

FIG. 6 is an explanatory diagram showing a first example of screens displayed on the display device 55 for an image capturing person, in the training data collection operation shown in FIG. 4. Shown in FIG. 6 are examples of screens when the learning data collection device 3 determines that a captured image is not suitable as training data based on results of (3) the determination on whether or not a transparent object is included in the captured image and (4) the determination on whether or not a plurality of objects are included in the captured image.

As described above, when an image capturing person starts shooting the recognition target (see step ST101 in FIG. 4), the display device 55 displays a shooting screen 61 shown in FIG. 6A, and then when the learning data collection device 3 determines that the captured image is not suitable as training data (No in ST104 in FIG. 4), the displayed screen changes from the shooting screen 61 to a notification screen 71, which includes, as shown in FIG. 6B, a message for prompting the image capturing person to confirm (receive an input provided by the image capturing person) the state of a detected object(s) in the captured image of the recognition target, relating to the determination in step ST105 in FIG. 4. The displayed notification screen 71 includes a first message 72 explaining that, since a transparent object or multiple objects have been detected in the captured image, the system requires the image capturing person's confirmation (an input indicating that the captured image includes either a transparent object or multiple objects).

Then, when the image capturing person confirms that a plurality of recognition targets are present and then clicks or presses a multiple object button 73 in the first message 72, the notification screen 71 displays, as shown in FIG. 6C, a new message (an instruction to reshoot) to the image capturing person relating to step ST106 in FIG. 4; that is, a second message 74 indicating an event which has occurred (in this case, the presence of multiple objects which are not allowed to be shot at the same time), and explaining that the image capturing person needs to reshoot a new image in a more proper state (in this case, in a state where one object is present).

When the image capturing person confirms that the recognition target is at least partially transparent and clicks or presses a transparent object button 76 in the first message 72, the notification screen 71 displays, as shown in FIG. 6D, a new message (a recommendation to reshoot) to the image capturing person relating to step ST108 in FIG. 4; that is, a third message 77 explaining that, preferably, the image capturing person reshoots a new image in a more proper state (in this case, by changing the way the recognition target is placed).

As described above, when determining the number of objects from a captured image, it is difficult to determine which is detected, a partially transparent object or a plurality of objects. In addition, when multiple objects are detected, the reshoot-instruction operation must be performed in order to avoid storing a feature of the multiple objects as that of one object). However, when the system is configured to perform the reshoot-instruction operation even when a partially transparent object is detected, a user needs to reshoot too often. In this light, in the example of FIG. 6, the system is configured to receive an input indicating a user's judgement on whether multiple objects are detected or a partially transparent object is detected, and then determine, based on the received user's input, whether the system should performs the reshoot-instruction operation required for the case of detection of multiple objects or the reshoot-recommendation operation required for the case of detection of an at least partially transparent object.

When an image capturing person's confirmation is not required on an object detected in the captured image of the recognition target, the system can skip the notification screen 71 (including a message for prompting the image capturing person to do the confirmation) as shown in FIG. 6B. In this case, the displayed screen changes from the screen as shown in FIG. 6A to either of that shown in FIG. 6C or that shown in FIG. 6D.

Embodiments of the present invention are not limited to those in which the display device 55 displays screens containing prescribed information for the operations in steps ST105, ST106, and ST108 as described above. For example, the system may be configured to use an audio output from speakers provided on the image capturing device 2 and the learning data collection device 3 to notify an image capturing person that the image capturing person needs to reshoot a new image. In other cases, the system may be configured to change operating states (lighting or blinking) of warning lamps provided on the image capturing device 2 and the learning data collection device 3 to notify an image capturing person that the image capturing person needs to reshoot a new image.

FIG. 7 is an explanatory diagram showing a second example of screens displayed on the display device 55 for an image capturing person, in the training data collection operation shown in FIG. 4. Shown in FIG. 7 are examples of screens when the learning data collection device 3 determines that a captured image is not suitable as training data based on results of (1) the determination on whether or not a similar object is registered, (5) the determination on whether or not improper lighting conditions are present, and (7) the determination on whether or not a low light condition is present.

Similar to the case of FIG. 6, when an image capturing person starts shooting the recognition target, the display device 55 displays a shooting screen 61 shown in FIG. 7A, and then when the learning data collection device 3 determines that the captured image is not suitable as training data, the displayed screen changes from the shooting screen 61 to one of the notification screens 81 shown in FIGS. 7B to 7D, each of which includes a corresponding message for prompting an image capturing person to reshoot a new image.

FIG. 7B shows an example of a screen displayed when the learning data collection device 3 determines that the captured image is not suitable as training data based on a result of (1) the determination on whether or not a similar object is registered. The screen is a notification screen 81 displays a message (a recommendation to reshoot) recommending an image capturing person to reshoot a new image; that is, a fourth message 82 indicating an event which has occurred (in this case, in a state where a different object similar to the recognition target is present, i.e. the different object has been registered in the ID model), and explaining that, preferably, the image capturing person reshoot a new image in a more proper state (for example, in a state where the way the recognition target is placed is changed).

FIG. 7C shows an example of a screen displayed when the learning data collection device 3 determines that the captured image is not suitable as training data based on a result of (5) the determination on whether or not improper lighting conditions are present (i.e., when the learning data collection device 3 determines that a blown out highlighted area is present in the captured image, but a proportion (or an area) of the blown out highlighted area therein is less than a prescribed threshold value). The screen is a notification screen 81 displays a message (a recommendation to reshoot) recommending the image capturing person to reshoot a new image; that is, a fifth message 83 indicating an event which has occurred (in this case, in a state where some blown out highlights are present in the captured image), and explaining that, preferably, the image capturing person reshoots a new image in a more proper state (in this case, in a state where the lighting condition is changed).

In a similar case to that of FIG. 7C, when the learning data collection device 3 determines that a proportion (or an area) of a blown out highlighted area present in the captured image is equal to or greater than the prescribed threshold value, the notification screen 81 displays a message (an instruction to reshoot) explaining that the image capturing person needs to reshoot a new image.

FIG. 7D shows an example of a screen displayed when the learning data collection device 3 determines that the captured image is not suitable as training data based on a result of (7) the determination on whether or not a low light condition is present. The screen is a notification screen 81 displays a message (a recommendation to reshoot) recommending the image capturing person to reshoot a new image; that is, a sixth message 84 indicating an event which has occurred (in this case, in a state where the brightness of the captured image is not sufficient), and explaining that, preferably, the image capturing person reshoots a new image in a more proper state (in this case, in a state where the lighting condition is changed).

Specific embodiments of the present invention are described herein for illustrative purposes. However, the present invention is not limited to those specific embodiments. In the learning data collection device, the learning data collection system, and the learning data collection method as described above, not all elements therein are essential. Thus, various modifications including elimination of some elements may be made to the embodiments as appropriate without departing from the scope of the invention.

In the above-described embodiments, the image capturing device 2 includes the fixed cameras 5A-5C, which are provided at respective fixed locations such that the facing directions of the cameras are not changed. However, images similar to those can be shot by those cameras can be acquired by using a single movable camera.

In the above-described embodiments, each of the results of the determination operations is associated with a corresponding determination on whether or not training data is permitted to be stored in the storage. However, the present invention is not limited to those specific embodiments. For example, when configuring a system with a high regard for the quality of training data, any collected training data may be banned from being stored in the storage. However, in the above-described embodiments, the system is configured such that, if use of acquired training data is unlikely to lead to the improvement of identification or image recognition of an object, the training data is banned from being stored, otherwise the training data is permitted to be stored. Specifically, when training data is permitted to be stored in the case that the determination operation (4) (i.e., the determination on whether or not a plurality of objects are included in the captured image) determines that a plurality of objects are included in a captured image, use of an ID model trained with that training data decreases the accuracy of recognition of the one object because a feature of the combination of the multiple objects is registered as that of one object. Similarly, when the determination operation (5) (i.e., the determination on whether or not improper lighting conditions (reflections) are present) determines that a proportion (or an area) of the blown out highlighted area present in the captured image is equal to or greater than a prescribed threshold value, storing that image will likely not lead to any significant improvement of an ID model trained with training data including the image because extraction of any feature cannot be made in that case.

INDUSTRIAL APPLICABILITY

A learning data collection device, a learning data collection system, and a learning data collection method according to the present disclosure achieve an effect of enabling, in collection of training data for image recognition, a reduction in collection of improper images which are not suitable as the training data, and are useful as a learning data collection device, a learning data collection system, and a learning data collection method for correcting training data used for image recognition.

Glossary 1 learning data collection system
2 image capturing device
3 learning data collection device
4 identification device
5A to 5C camera
6 recognition target
11 image acquirer
12 image determiner
13 notification controller
21 identification model
22 storage
23 identification model learner
24 image identifier
41 turntable
46 to 48 captured image
51 processor
54 storage device
55 display device
56 input device
57 communication module
61 shooting screen
62 shooting button
63 registration button
71, 78 notification screen
72 first message
74 second message
77 third message
82 fourth message
83 fifth message
84 sixth message

The invention claimed is:

1. A learning data collection device for collecting captured images generated by an image capturing device as training data for image recognition, the image capturing device being used by an image capturing person to shoot an image of a recognition target, the learning data collection device comprising:
  a processor configured to perform operations for collection of the training data,
  wherein the processor is configured to:
  acquire a captured image from the image capturing device;
  determine whether or not the captured image is suitable as the training data;
  in response to determining that the captured image is not suitable as the training data, perform a notification operation to prompt the image capturing person to reshoot a new image to replace the captured image determined to be not suitable as the training data;
  acquire a result of an operation for image recognition of the recognition target in the captured image registered as the training data, wherein a prebuilt trained identification model is used in the operation for image recognition; and
  in response to the result of the operation for image recognition indicating that the recognition target has a recognition confidence score above a prescribed threshold value to be recognized as a different object registered as the training data, determine that the captured image is not suitable as the training data.

2. The learning data collection device according to claim 1, further comprising a display device configured to display information based on a control of the processor,
  wherein, as the notification operation, the processor causes the display device to display a notification screen for prompting the image capturing person to reshoot the new image.

3. The learning data collection device according to claim 1, wherein the processor is configured to:
  perform a determination operation by using different determination criteria to determine whether or not each captured image is suitable as the training data; and perform a selected one of different modes of the notification operation depending on types of the determination criteria used for the determination operation.

4. The learning data collection device according to claim 3, further comprising a storage device for storing data based on a control of the processor; and
wherein the different modes of the notification operation include:
a reshoot-instruction operation which is performed such that the training data associated with the captured image is banned from being stored in the storage device; and
a reshoot-recommendation operation which is performed such that the training data associated with the captured image is permitted to be stored in the storage device.

5. The learning data collection device according to claim 4, wherein the processor is configured to:
in response to determining that the captured image includes a plurality of recognition targets, accept an input indicating that the recognition targets include either a plurality of objects or an object having a transparent part;
in response to receiving the input indicating that the recognition targets include the plurality of objects, perform the reshoot-instruction operation; and
in response to receiving the input indicating that the recognition targets include the object having the transparent part, perform the reshoot-recommendation operation.

6. The learning data collection device according to claim 4, wherein the processor is configured to:
before determining whether or not each captured image is suitable as the training data, store the captured image acquired from the image capturing device in the storage device as training data; and
in response to performing the reshoot-instruction operation for the captured image which is determined to be not suitable as the training data, cancel registration of the captured image registered as the training data.

7. The learning data collection device according to claim 1, wherein the processor is configured to:
acquire a set of captured images of the recognition target, the captured images having been simultaneously captured from opposite directions; and
in response to determining that the set of captured images includes at least one captured image that is not suitable as the training data, perform the notification operation to prompt the image capturing person to reshoot a new set of images to replace the set of captured images.

8. A learning data collection system comprising the learning data collection device according to claim 1, and the image capturing device.

9. A learning data collection method for collecting captured images generated by an image capturing device as training data for image recognition, the image capturing device being used by an image capturing person to shoot an image of a recognition target, the method comprising:
acquiring a captured image from the image capturing device;
determining whether or not the captured image is suitable as the training data;
in response to determining that the captured image is not suitable as the training data, performing a notification operation to prompt the image capturing person to reshoot a new image to replace the captured image determined to be not suitable as the training data;
acquiring a result of an operation for image recognition of the recognition target in the captured image registered as the training data, wherein a prebuilt trained identification model is used in the operation for image recognition; and
in response to the result of the operation for image recognition indicating that the recognition target has a recognition confidence score above a prescribed threshold value to be recognized as a different object registered as the training data, determining that the captured image is not suitable as the training data.

10. The learning data collection method according to claim 9, wherein the performing of the notification operation comprises causing a display device to display a notification screen for prompting the image capturing person to reshoot the new image.

11. The learning data collection method according to claim 9, further comprising:
performing a determination operation by using different determination criteria to determine whether or not each captured image is suitable as the training data; and
performing a selected one of different modes of the notification operation depending on types of the determination criteria used for the determination operation.

12. The learning data collection method according to claim 11, wherein the different modes of the notification operation include:
a reshoot-instruction operation which is performed such that the training data associated with the captured image is banned from being stored in a storage device; and
a reshoot-recommendation operation which is performed such that the training data associated with the captured image is permitted to be stored in the storage device.

13. The learning data collection method according to claim 12, further comprising:
when determining that the captured image includes a plurality of recognition targets, accepting an input indicating that the recognition targets include either a plurality of objects or an object having a transparent part;
when receiving the input indicating that the recognition targets include the plurality of objects, performing the reshoot-instruction operation; and
when receiving the input indicating that the recognition targets include the object having the transparent part, performing the reshoot-recommendation operation.

14. The learning data collection method according to claim 13, further comprising:
before determining whether or not each captured image is suitable as the training data, storing the captured image acquired from the image capturing device in the storage device as the training data; and
when performing the reshoot-instruction operation for the captured image which is determined to be not suitable as the training data, canceling registration of the captured image registered as the training data.

15. The learning data collection method according to claim 9, further comprising:
acquiring a result of an operation for the image recognition of the recognition target in the captured image registered as the training data, wherein a prebuilt trained identification model is used in the operation for the image recognition; and
when, from the result of the operation for the image recognition, the recognition target is determined to be identical with or similar to an object registered as the training data, determining that the captured image is not suitable as the training data.

16. The learning data collection method according to claim 9, further comprising:

performing an operation for the image recognition of the recognition target in the captured image registered as the training data, wherein a prebuilt trained identification model is used in the operation for the image recognition; and when, from a result of the operation for the image recognition, the recognition target is determined to be similar to an object registered as the training data, determining that the captured image is not suitable as the training data.

* * * * *